(12) United States Patent
Bowers et al.

(10) Patent No.: US 11,681,870 B2
(45) Date of Patent: Jun. 20, 2023

(54) REDUCING LATENCY AND IMPROVING ACCURACY OF WORK ESTIMATES UTILIZING NATURAL LANGUAGE PROCESSING

(71) Applicant: Ensono, LP, Downers Grove, IL (US)

(72) Inventors: Jeremy Bowers, Downers Grove, IL (US); David Pearson, Downers Grove, IL (US)

(73) Assignee: ENSONO, LP, Downers Grove, IL (US)

( * ) Notice: Subject to any disclaimer, the term of this patent is extended or adjusted under 35 U.S.C. 154(b) by 111 days.

(21) Appl. No.: 16/963,882

(22) PCT Filed: Jan. 28, 2019

(86) PCT No.: PCT/US2019/015447
§ 371 (c)(1),
(2) Date: Jul. 22, 2020

(87) PCT Pub. No.: WO2019/148115
PCT Pub. Date: Aug. 1, 2019

(65) Prior Publication Data
US 2021/0050019 A1 Feb. 18, 2021

Related U.S. Application Data

(60) Provisional application No. 62/622,559, filed on Jan. 26, 2018.

(51) Int. Cl.
*G06F 40/20* (2020.01)
*G10L 15/22* (2006.01)
*G10L 15/34* (2013.01)

(52) U.S. Cl.
CPC .............. *G06F 40/20* (2020.01); *G10L 15/22* (2013.01); *G10L 15/34* (2013.01)

(58) Field of Classification Search
CPC .......... G06F 40/20; G06F 40/58; G06F 40/30; G06F 3/167; G06Q 10/06; G10L 15/34; G10L 15/22
See application file for complete search history.

(56) References Cited

U.S. PATENT DOCUMENTS

| 6,404,857 | B1 * | 6/2002 | Blair ...................... G10L 15/26 379/135 |
| 10,409,551 | B1 * | 9/2019 | Waugh ................... G10L 15/26 |
| 10,983,789 | B2 * | 4/2021 | Muddakkagari .......... G06F 8/33 |

(Continued)

OTHER PUBLICATIONS

Ionescu, Vlad-Sebastian. "An approach to software development effort estimation using machine learning." 2017 13th IEEE International Conference on Intelligent Computer Communication and Processing (ICCP). IEEE, 2017. (Year: 2017).*

(Continued)

*Primary Examiner* — Brian L Albertalli
(74) *Attorney, Agent, or Firm* — Bryan Cave Leighton Paisner LLP

(57) ABSTRACT

Disclosed are devices, systems, apparatuses, methods, products, and other implementations for improving the accuracy and latency in work estimation systems and methods through the invocation of serverless applications and/or servers and the interfacing of natural language processing endpoint devices.

20 Claims, 6 Drawing Sheets

(56) References Cited

U.S. PATENT DOCUMENTS

| | | | |
|---|---|---|---|
| 2009/0210232 A1 | 8/2009 | Sanchez | |
| 2009/0240729 A1 | 9/2009 | Zwol et al. | |
| 2011/0238407 A1 | 9/2011 | Kent | |
| 2014/0188473 A1 | 7/2014 | Lambdin et al. | |
| 2015/0066479 A1 | 3/2015 | Pasupalak et al. | |
| 2016/0077832 A1* | 3/2016 | Bhattacharyya | G06Q 10/06 717/101 |
| 2017/0255612 A1 | 9/2017 | Sarikaya et al. | |
| 2017/0293610 A1 | 10/2017 | Tran | |
| 2017/0364824 A1* | 12/2017 | Boyer | G06N 5/00 |
| 2018/0307998 A1* | 10/2018 | Strachan | G06N 7/005 |
| 2019/0214002 A1* | 7/2019 | Park | G10L 15/30 |
| 2021/0125124 A1* | 4/2021 | Meharwade | G06N 20/00 |

OTHER PUBLICATIONS

Dragicevic, Srdjana, Stipe Celar, and Mili Turic. "Bayesian network model for task effort estimation in agile software development." Journal of systems and software 127 (2017): 109-119. (Year: 2017).*

Moharreri, Kayhan, et al. "Cost-effective supervised learning models for software effort estimation in agile environments." 2016 IEEE 40th Annual Computer Software and Applications Conference (COMPSAC). vol. 2. IEEE, 2016. (Year: 2016).*

Porru, Simone, et al. "Estimating story points from issue reports." Proceedings of the the 12th International Conference on Predictive Models and Data Analytics in Software Engineering. 2016. (Year: 2016).*

Sapre, Alhad Vinayak. Feasibility of automated estimation of software development effort in agile environments. Diss. The Ohio State University, 2012. (Year: 2012).*

Ionescu, Vlad-Sebastian, Horia Demian, and Istvan-Gergely Czibula. "Natural language processing and machine learning methods for software development effort estimation." Studies in Informatics and Control 26.2 (2017): 219-228. (Year: 2017).*

McKinney, Wes. Python for data analysis: Data wrangling with Pandas, NumPy, and IPython. "O'Reilly Media, Inc.", 2012. (Year: 2012).*

Wang, Sida I., and Christopher D. Manning. "Baselines and bigrams: Simple, good sentiment and topic classification." Proceedings of the 50th Annual Meeting of the Association for Computational Linguistics (vol. 2: Short Papers). 2012. (Year: 2012).*

Scikit-Learn. "Naive Bayes", Apr. 25, 2017. Retrieved from https://web.archive.org/web/20170425223954/https://scikit-learn.org/stable/modules/naive_bayes.html (Year: 2017).*

Roberts, Mike. "Serverless Architectures", Jun. 17, 2016. Retrieved from https://web.archive.org/web/20160618153754/http://martinfowler.com/articles/serverless.html (Year: 2016).*

Patent Cooperation Treaty, International Search Report for PCT/US2019/015447, 2 pages dated Apr. 26, 2019.

European Patent Office, Extended European Search Report and Written Opinion issued for 19744314.6, 11 pages dated Sep. 23, 2021.

Yan et al., Building a chatbot with serverless computing, Mashups of Things and Apis, 14 pages 2016.

Von Bjorn Bottcher, Mysterium Serverless—Ein Ausflug in die Welt von Serverless-Architeckturn—Teil 1—Cloudlfight, retrieved from de.cloudflight.io/presse/mysterium-serverless-ein-ausflug-die-welt-von-serverless-architekturen-teil-1-25044 2017.

Von Bjorn Bottcher, Contributions by Bjorn Bottcher, retrieved from de.cloudflight.io/author/bjoern-boettcher/page/2/ 2017.

* cited by examiner

303 — Sprint          43 – Quarterflesh

302 — Story Points:   1

301 — User Story:     ∨ As a gateway user

I want to be able to filter on request tickets more easily

So that I can be sure I'm seeing the type of tickets I want to see

Assumptions:         1. ?

Acceptance Criteria: ∨ 1. Scenario: Add Request to QuickFilter Type Dropdown

Given I am a gateway user

And I am in the tickets module

And I am in the quickfilter configuration view

When I click the Type dropdown

Then I will be able to see/select an entry called "Request"

2. Scenario: Requests No Longer Appear When QF Using Incident Type is Configured

Given I am a gateway user

When I configure a tickets quickfilter

And I select the incident type

Then tickets of type incident with category request will no longer display in the returned ticket list Tech Notes           1. Requests will use the same quickfilter options as incidents Attachments

Figure 3A

PMG Business Process management / BPM-096

Create an Edit Mainframe Approved Downtime Form   Figure 3C

[Edit] [ ◯ Comment ]   [Assign] [Move ▼] [Blocked] [Close] [Workflow ▼]   [Admin ▼]

Details

| | | | |
|---|---|---|---|
| Type | Story | Status: | DEV IN PROGRESS (View Workflow) — 304 |
| | | Resolution: | Unresolved |
| Labels | None | | |
| Epic Link | Mainframe downtime schedule information | | |
| 303 — Sprint | 25 — PMG Sprint 17-25 | | |
| 302 — Story Points: | 3 | | |
| 301 — User Story: | ∨ As a CSO User | | |
| | I want to edit downtime schedules as contracts are resolved | | |
| | So that mainframe developers have the latest approved times | | |
| Assumptions: | 1. ? | | |
| Acceptance Criteria: | ∨ 1. Scenario: | | |
| | Given Approved mainframe downtimes are opulated in the db table | | |
| | When accessing the Edit form | | |
| | Then the user will select the tenant to edit for | | |
| | AND all set downtimes in the db will be returned to the page | | |
| | 2. Scenario | | |
| | Given a tenant is selected | | |
| | When the approved times are returned to the page | | |

People
Assignee: Paul
Reporter: Jon
Watchers: PMG
Votes: 0 Votes for this issue
Watchers: 1 Start watching this issue

Dates
Created: 10/Nov/17 11:20AM
Updated: Yesterday

Development
Create branch

Agile
Active Sprints: 25 — PMG Sprint 17-25 ends 19/Dec/17
Views on Board
HipChat discussions: Do you want to discuss this issue? Connect to HipChat
Connect  Dismiss

REDUCING LATENCY AND IMPROVING ACCURACY OF WORK ESTIMATES UTILIZING NATURAL LANGUAGE PROCESSING

CROSS-REFERENCE TO RELATED APPLICATIONS

The present application claims priority as a 371 national phase application of PCT/US19/15447, filed on Jan. 28, 2019, which claims priority to U.S. Provisional Patent Application No. 62/622,559 filed on Jan. 26, 2018, which is incorporated herein by reference in its entirety.

TECHNICAL FIELD

The present invention is related to devices, systems and methods for reducing the latency and improving accuracy of work estimates utilizing natural language processing devices and serverless event-driven parallel data processing architectures.

BACKGROUND

Agile software development techniques typically focus on sustainable software development practices. Timely delivery of software products rely on product owners prioritizing and estimating the implementation of desired features and fixes. However, agile development techniques typically involve estimates from different team members that are capable of providing different perspectives on the product and the work required to deliver a user story. Further, because agile development techniques break work into discrete granular tasks, estimation is usually performed on smaller scales.

In some scenarios, the confidence in estimating tasks taking more than 16 hours becomes very low. Low accuracy is in part due to the wide array of factors that can significantly impact an estimate. Moreover, each factor can vary greatly across individual software developers, team compositions, and the nature of the tasks. Task estimation is thus frequently inaccurate when taking into account the various capabilities of software teams and its members, and the task to be completed.

As a result, agile development has generally focused more on determining reliable "velocities," or the number of estimation units that a team tends to complete from sprint to sprint, rather than on the accuracy of an estimation. Moreover, with large teams that have a greater number of factors impacting the analysis, the estimation process can become mired with delays, and can thus itself be a time-consuming process. Accordingly, a need exists for accurately and expediently estimating and forecasting the completion of various tasks taking into account the various factors and perspectives of a software development team.

Moreover, while estimates can be shaped in part by prior team experience, such prior experiences are typically only used to frame the estimates in rough and imprecise terms. They typically do not, for example, use statistical precise historical data, or complex machine learning methodologies to calculate a precise and accurate estimate.

Managing software teams is also typically facilitated with the help of one or more project management platforms. For example, agile development teams typically manage the scope and structure of their work using project management tools that visualize deliverables and milestones with scrum boards, Kanban boards, roadmaps and similar tracking visualizations. Such project management tools are typically capable of organizing work into agile delivery vehicles, such as epics, stories, versions, or sprints. Agile development vehicles offer the benefits of organizing work into manageable discrete subparts, so that teams can prioritize customer feedback and deviate from original plans with minimal disruption to their business.

However, several drawbacks with project management platforms exist. For example, such platforms typically do not provide the ability to perform or invoke serverless applications and/or servers. Moreover, such platforms typically do not provide the ability to interface with natural language processing endpoint devices, such as for example, Amazon Alexa, Google Home, Microsoft Cortana, Apple Siri, and similar devices.

Accordingly, a need exists for systems and methods that are capable of accurately estimating and forecasting tasks, while providing the ability to perform or invoke serverless applications and/or servers and the ability to interface with natural language processing endpoint devices.

SUMMARY

In various embodiments, the invention provides systems, methods, and apparatuses for optimizing the application of machine learning to estimation techniques in a system that facilitates serverless applications and/or servers and the ability to interface with natural language processing endpoint devices. According to some embodiments of the invention, the systems, methods, and apparatuses include a project management platform, a natural language input and output device, a voice processing service, and a serverless compute service. A user can obtain a work estimate by providing input to the natural language input and output device. The natural language input and output device captures and transmits the audio and/or video input to the voice processing service. The voice processing service processes the audio and/or video input to identify a command and one or more parameters. When the voice processing service recognizes a command that corresponds to a request for a work estimate, the voice processing service sends an event trigger and the one or more parameters to the serverless compute service. The serverless compute service executes application code in response to the event trigger.

The application code comprises instructions to determine a work estimate based on the one or more parameters. The one or more parameters define the scope of the work estimate. The work estimate is determined by applying a Bayesian classifier to the one or more parameters, and information from the project management platform including information about one or more completed work projects. In this way, embodiments of the invention achieve accurate work estimates through the invocation of serverless applications and/or servers and the interfacing of natural language processing endpoint devices.

According to some embodiments of the invention, the invention provides systems, methods, and apparatuses for optimizing the application of machine learning to estimation techniques with methods that facilitate serverless applications and/or servers and the ability to interface with natural language processing endpoint devices. According to some embodiments of the invention, the methods can store information about one or more completed work projects in a project management platform using a database. The method can capture audio and video input from a user through a natural language input and output device. The natural language input and output device can comprise a speech engine that controls the capture of an audio and video data stream upon detection of a wake word and a communication interface that establishes a communication channel between the natural language input and output device and a voice processing service.

The method can process the audio and video data stream through a voice processing service to identify a command and one or more parameters. When the command corresponds to a request for a work estimate, an event trigger and the one or more parameters is sent to a serverless compute service.

The method can receive application code and the one or more parameters at the serverless compute service. The application code executes in response to an event trigger, and determines a work estimate based on the one or more parameters, which define the scope of the work estimate. The work estimate is determined by applying a Bayesian classifier to the one or more parameters, and the information about one or more completed work projects. The voice processing service can create one or more response messages for transmitting to the natural language input and output device. The method can then output an audio or video message including the work estimate.

BRIEF DESCRIPTIONS OF THE DRAWINGS

The objects and features of the invention can be better understood with reference to the following detailed description and accompanying figures.

FIGS. 3A, 3B, 3C show exemplary stories according to embodiments of the invention.

DETAILED DESCRIPTION

The disclosed subject matter relates to devices, systems and methods for reducing latency and improving accuracy of work estimates utilizing natural language processing devices and serverless event-driven parallel data processing architectures.

Figure 1:
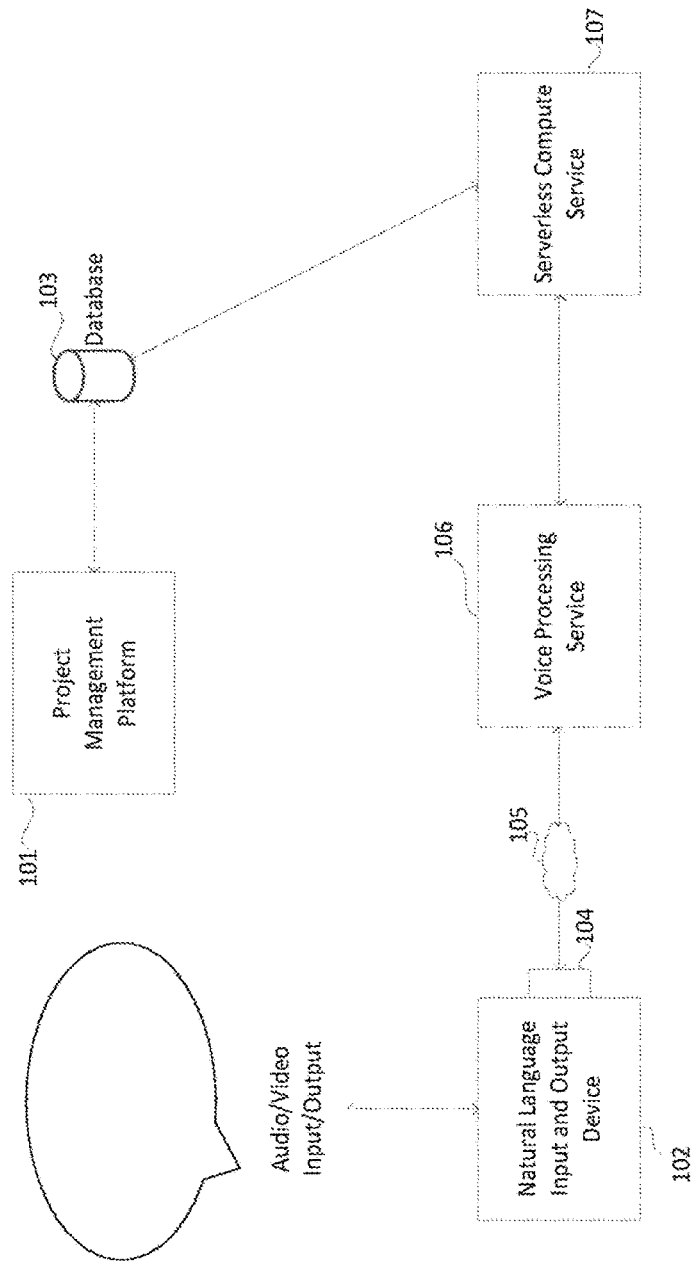
FIG. 1 shows an exemplary system for reducing the latency and improving accuracy of work estimates utilizing natural language processing devices and serverless event-driven parallel data processing architectures according to embodiments of the invention.

FIG. 1 shows exemplary devices, systems, apparatuses and methods for reducing latency and improving accuracy of work estimates utilizing natural language processing devices and serverless event-driven parallel data processing architectures. In some embodiments of the invention, a system for reducing the latency and improving accuracy in estimating work utilizing natural language processing devices and serverless event-driven parallel data processing architectures includes a project management platform 101, a natural language input and output device 102, a database 103, a communication interface 104, a communication channel 105, a voice processing service 106, and a serverless compute service 107.

The project management platform can be configured to store information about one or more completed work projects in the database which can store completed stories and story point values. The natural language input and output device can be configured to capture audio or video input from a user using a speech engine and output an audio or video message including a work estimate. The speech engine can be configured to capture audio and video data streams when it detects a wake word. The audio and video data streams can be transmitted from the natural language input and output device to the voice processing service over a communication channel established by the communication interface. The voice processing service can be configured to process the audio and video data stream to identify a command and one or more parameters that define the scope of a work estimate. It can also be configured to create one or more response messages that are transmitted back to the natural language input and output device to output to a user. When the command corresponds to a request for the work estimate, the voice processing service can be configured to transmit an event trigger and the one or more parameters to the serverless compute service.

The serverless compute service can be configured to receive application code, and the one or more parameters transmitted from the voice processing service. The application code can execute in response to the event trigger and include instructions to determine the work estimate based on the one or more parameters. The work estimate can be determined by applying a Bayesian classifier to the one or more parameters, and the information about one or more completed work projects stored in the project management platform.

In some embodiments of the invention, a project management platform can be configured to organize work into a hierarchy. For example, the project management platform can organize work into versions for representing a release, epics for representing one or more features or initiatives, stories for representing issues or tasks that correspond to implementing the feature or initiative, and sub-tasks that represent a smaller level of granularity for completing a story.

A project manager can receive one or more software system requirements, which can then be expressed as a story in one or more sentences using natural language that outlines a desired outcome. The story can represent the smallest unit of work in a company's software development framework. The story can be made up of one or more individual tasks which can be represented as sub-tasks.

The project management platform can include an interface through which users can enter, edit, and submit stories, sub-tasks, epics, and releases. For example, a project manager can enter a story including sub-tasks that describe a feature requested by a customer in a set of system requirements. The story can also include attribute information, such as the larger epic that the feature belongs to. For example, the story can specify that a particular feature is part of an initiative to implement functionality on a mobile device. The attribute information can also specify one or more developers that make up the team assigned to work on the story. A work estimate can represent an estimate for work at the level of granularity determined by the project management platform, such as for example, a story, a sub-task, an epic, or a release.

Once entered, the team of developers assigned to the story can each individually view, edit, and/or revise the story and sub-tasks. When the story and sub-tasks have been finalized, the story can be submitted and added to a work queue.

From the interface of the project management platform, a user can view the stories that have been added to the work queue. The work queue can be filtered according to one or more attributes. For example, a user can filter stories that belong to the same initiative, such as the functionality on a mobile device described above. The work queue can also be filtered for example, according to team members.

In some embodiments, the relative effort of work to complete a story can be represented as a story point, which in turn, can be used to estimate when a story might be completed. Factors that impact the story point rating can include the story's complexity and/or acceptance criteria, for example. While some software teams can estimate the completion date for a certain amount of work in terms of days, weeks, months, etc., a story point can be dimensionless. For example, a story that involves numerous sub-tasks with high levels of complexity that will take a significant amount of time to complete can be scored at 50 points. By contrast, a simple story that can be completed with relative ease can be scored at 0.5 points.

In some embodiments, each member of a team assigned to a story can provide a story point estimate. When team members provide different story point estimates, the team can discuss the differences in estimates, and how to reconcile the differences until the team has reached a consensus. The project management platform can associate the story point estimate provided by the team with the story and store it in a historical database for keeping track of story point estimates. The story entries in the database can be associated with a unique identifier. In some embodiments, the project management platform can also keep track of how much time was actually needed to implement a story. For example, a team may have taken much longer on a particular story than originally estimated; the amount of actual time and effort spent on the story can be recorded by the project management platform. The project management platform can then be used to determine the margin of error for a particular estimate. As described in more detail below, the project management platform can also use the historical story point estimates in combination with Bayesian classification techniques to accurately determine and verify new story point estimates.

When a team is asked to generate a new estimate for a new story, embodiments of the invention can use historical story point data to accurately and efficiently calculate the relative amount of work to complete the story. Embodiments of the invention can search for stories previously completed having similar descriptions, attributes, sub-tasks, and other qualities that define the nature and scope of the story. The story point estimates for these previously completed stories can then be used to calculate an estimate for the new story.

For example, a new story can be added to a work queue requesting that a team implement a feature (e.g., installing a firewall on desktop computers). Such a story can be, for example, one of several stories that make up repetitive epics to build ITSM system integrations with clients. As another example, feature implementations can include developing UI concepts such as applying responsive design to a webpage, or lazy loading to a poor performing webpage. The project management platform can then search for similar stories in the historical database. The project management platform might search for stories based on a variety of attributes, such as for example, the similarity of their descriptions, the composition of the team members, the number and type of sub-tasks that are involved, and/or the epic they are associated with. Thus, the project management platform can find a previous story completed by the same team, requesting that it implement a similar feature (e.g., installing a firewall on laptop computers). The project management platform can then look up the associated story point estimate and actual time it took for the team to complete this story. This information can then be used as guide posts for calculating a new story point estimate for the new feature (e.g., installing a firewall on desktop computers). As described in more detail below, according to some embodiments of the invention, the historical database can be used as a data set for training a Bayesian classifier to calculate story point estimates.

Numerous classification techniques exist for classifying an observed event based on historical data. Some classification algorithms include, for example, the C4.5 algorithm, the ID3 algorithm, the K-nearest neighbor algorithm, the Support Vector Machine algorithm, and Artificial Neural Networks. However, each classification technique has several limitations and disadvantages. For example, the C4.5 algorithm performs poorly on small datasets, and small variations in data lead to different decision trees. ID3 algorithms can require large searching times and can require a large amount of memory to process. K-nearest neighbor algorithms are time consuming, sensitive to noisy or irrelevant attributes, and the performance can vary depending on the number of dimensions used. Support vector machine algorithms can consume large amounts of memory. Artificial Neural Networks can require high processing times when the neural network is large.

Based on performance analyses of the invention, Bayesian classifiers provide an optimum level of performance as compared to other classification techniques, for determining a story point estimate. Specifically, measurements of the performance characteristics of the system and methods according to embodiments of the invention show that Bayesian classifiers outperform other classifiers that would otherwise require large data sets. Bayesian classifiers outperform other classifiers in part because historical databases can have small or limited stories that form the data set. Bayesian classifiers also outperform other classifiers because of their ability to handle text classification in scenarios involving multiple classes/categories. Additionally, Bayesian classifiers consume limited CPU and memory resources.

Several techniques can be used to address problems with integrating Bayesian classifiers in the estimation systems and methods described herein. For example, when there are no occurrences of a class label and a certain attribute value together, then the frequency-based probability estimate will be zero. When all the probabilities are multiplied, it can result in a 0 (zero) posterior probability estimate. However, techniques can be employed to address this problem. For example, smoothing techniques such as Laplace estimation, or Lagrange correction can be employed.

According to embodiments of the invention, stories can be treated as unstructured data, and can be broken down into individual elements corresponding to certain words or phrases that are pertinent to calculating a story point estimate. For example, as shown in FIG. 3, a story can be broken down into key words including "I want to," "so that," "filter," and "tickets." The category or class that is assigned to the story is its story point value.

In some embodiments, the individual elements of the stories can be made accessible through an API, such as a REST API. The APIs can extract and provide the story elements as a formatted data structure, such as JSON key value pairs, or as an XML document. In some embodiments, formatted data can be extracted for the stories in the historical database and used to create DataFrames. DataFrames are 2-dimensional labeled data structures with columns of potentially different types. DataFrames can be accessed by index (i.e., row label) and column (i.e., column label).

A trained data set can include all the previously completed stories, and their associated story point values. Prior probabilities can be calculated as the probability of a story having a specific classification or category (i.e., story point value) from the given set of stories. For example, the prior probability of stories being 10 story points would be the number of documents having this value divided by the total number of stories. Likelihoods can be calculated as the conditional probability of a word or phrase occurring in a story given that the story belongs to a particular category (i.e., story point value). Conditional probabilities can then be calculated for each word or phrase in the historical database of stories. In some embodiments, Naïve Bayes Linear SVM techniques can be used to perform modelling on the data. Multinomial Naïve Bayes techniques provide a high degree of accuracy.

Estimates for new stories can be classified based on the prior probabilities and likelihoods described above. For example, the most probable story point value can be calculated for each word or phrase in the story using the prior probabilities and likelihoods, and treating the new words or phrases as observed events. Thus, it can be determined for example, that a story will take about 10 story points of work to complete based on the words or phrases used in the story.

In some embodiments, Term Frequency, Inverse Document Frequency (TF-IDF) can be used to convert the words of a story into vectors. For example, the phrase "Hello good morning" can be represented with the following N-dimensional numeric vector: [0.25 0.35 0.5]. TF-IDF has been found to provide better statistical performance than simple count vectorizers in accordance with the systems and methods described herein.

In some embodiments of the invention, certain words or phrases can be accorded different weight in calculating the conditional probabilities. Thus, certain words or phrases can assume greater importance in determining a story point value. For example, certain sub-tasks which are particularly time-consuming can be assigned greater weight.

In some embodiments, a natural language input and output device can be used to assist with the deconstruction of the stories into individual elements. For example, a natural language input and output device in conjunction with voice processing services can capture audio and/or video input streams, and remove certain stop words, punctuation characters, and other linguistic constructs that are not informative or relevant to calculating a story point estimate. The voice processing service can then process the audio and/or video input streams to identify certain keywords or phrases. For example, the voice processing service can be configured to identify a command, such as "determine an estimate." Keywords or phrases that are part of a story (e.g., "filter," and "tickets") can be identified as one more parameters that will be used for Bayesian classification as described in further detail below. In some embodiments, a user can simply say the story's unique identifier, and the remaining story details can be retrieved from a database.

In some embodiments of the invention, the Bayesian classification can be performed by a serverless compute service. The serverless compute service can be configured to receive application code, such as for example software code for performing Bayesian classification algorithms on trained data sets. The application code executes in response to the serverless compute service receiving an event trigger. An event trigger may be, for example, a command to determine an estimate.

The serverless compute service can receive one or more parameters from the voice processing service. The parameters can correspond to keywords or phrases that are part of the story. When the application code executes, the Bayesian classification algorithms use the keywords or phrases in calculating a work estimate. For example, a story point value can be estimated by classifying the parameters (keywords or phrases) based on prior probabilities and likelihoods stored in a historical database as described above.

The estimated story point value can then be transmitted back to the voice processing service. The voice processing service can generate a response message that includes a natural language description of the work estimate. For example, a response message may include the phrase, "this is estimated to be 10 story points," in the form of audio or video. The voice processing service can then transmit the response message back to the natural language input and output device. The natural language input and output device can then play response messages back to the project manager who originally requested the estimate in the form of an audio file.

Figure 3B:
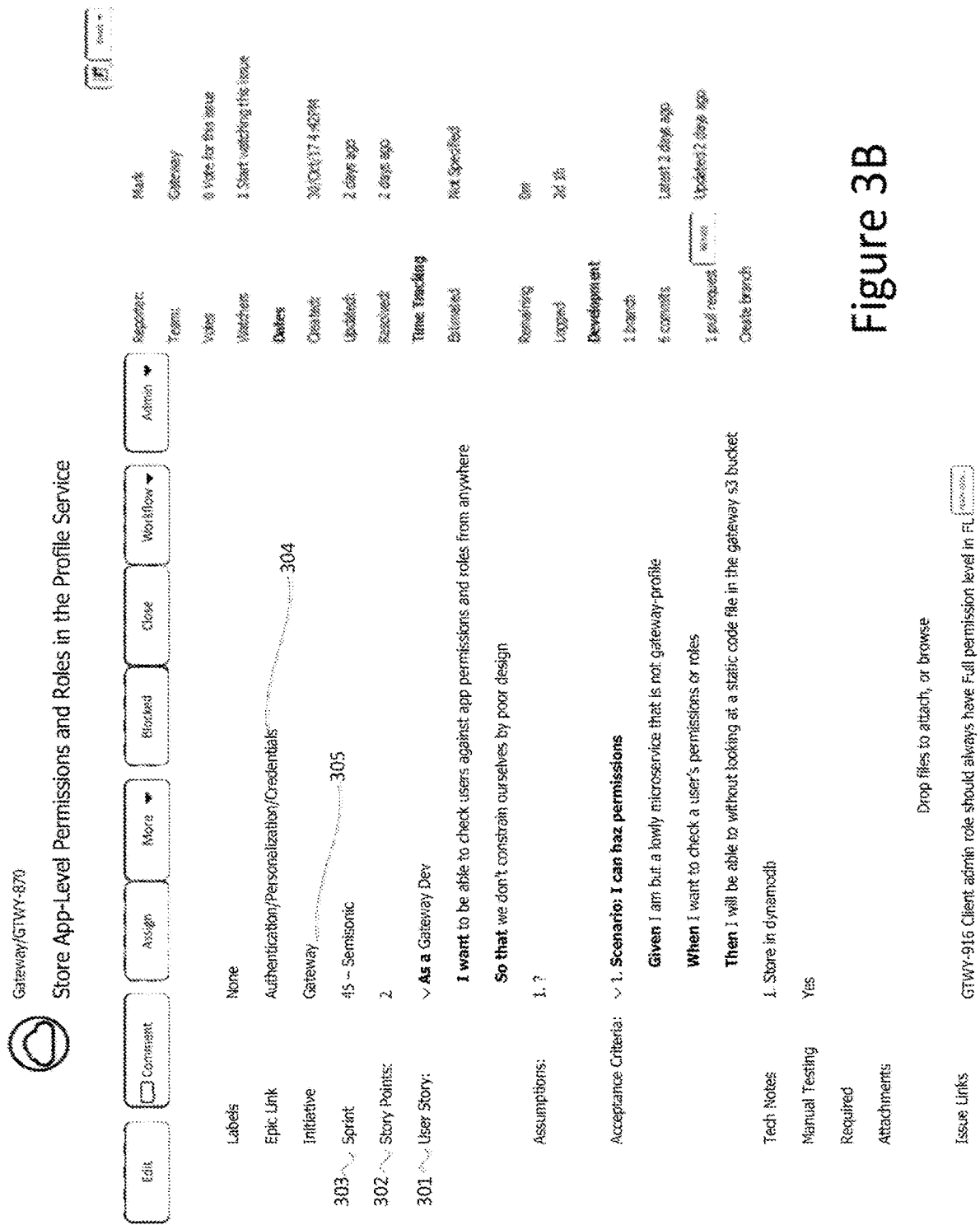

A natural language input and output device may be, for example, an Amazon Echo, and the voice processing service may be, for example, Amazon's Alexa Voice Service. Thus, a project manager can ask Alexa to provide an estimate for the story described in FIGS. 3A-3C. As shown in FIGS. 3A-3C, an exemplary story 301 is given a story point value 302, and is associated with a sprint 303. As shown in FIGS. 3B and 3C the exemplary stories are also associated with an epic 304 and in FIG. 3B, an initiative 305. The audio and/or video stream captured by Amazon Alexa can correspond to the story being read aloud by a project manager. Amazon Alexa can then establish a communication channel to the Alexa Voice Service, i.e., voice processing service, for delivering the audio and/or video stream and receiving a response that includes the estimate.

Figure 4:
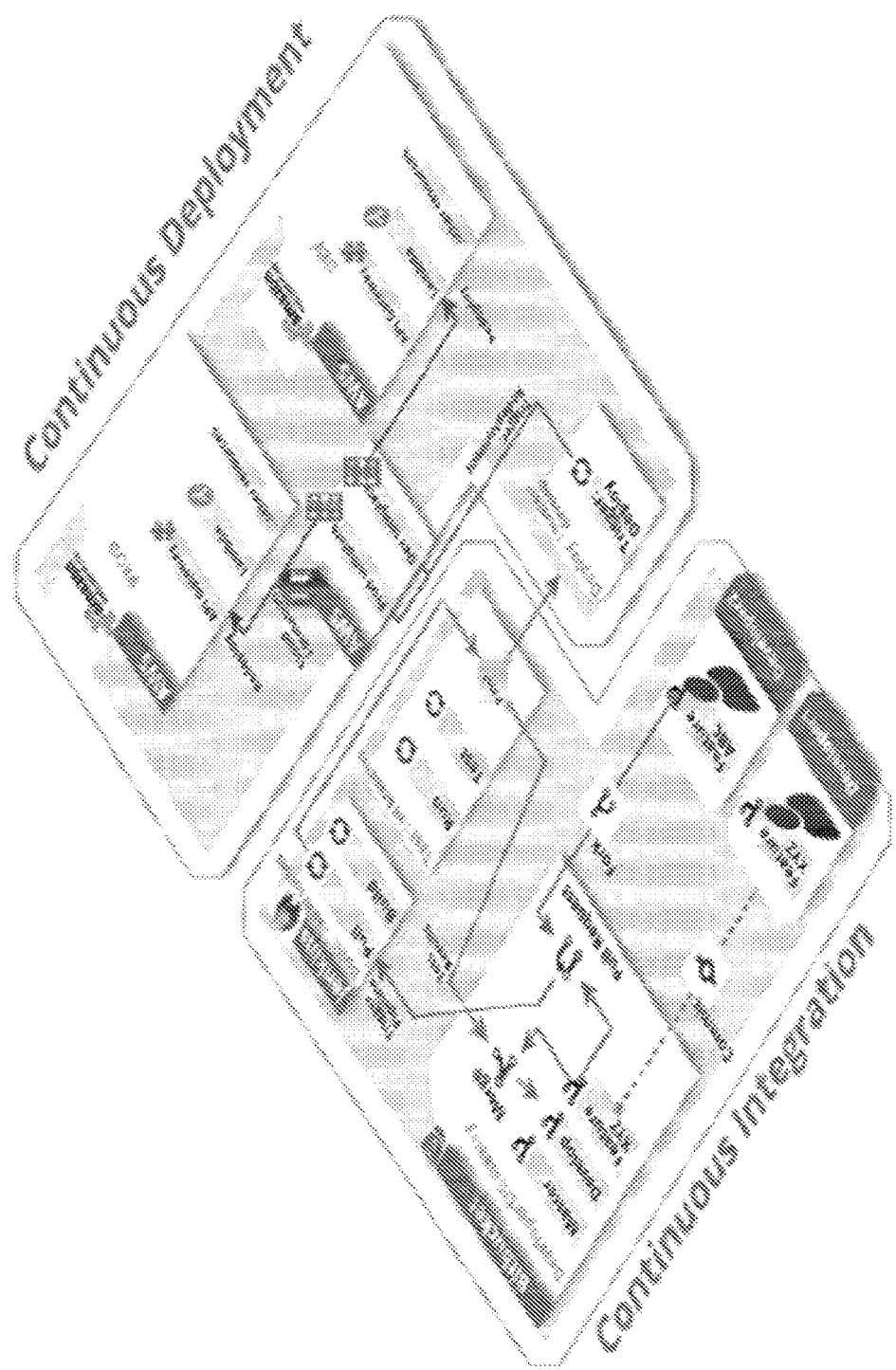
FIG. 4 shows an exemplary serverless event-driven parallel data processing architecture according to embodiments of the invention.

According to some aspects of the invention, the systems and methods are implemented through a serverless event-driven parallel data processing architecture as shown in FIG. 4. The systems and methods may be serverless from the perspective of a development team by hosting the serverless compute service in a cloud service managed by a third party. Thus, the software development team can create application code for executing Bayesian classification without having to host or maintain its own servers.

A serverless compute service may be for example, Amazon Lambda service. The application code may include, for example, PHP and Python code for implementing the Bayesian classification algorithms. In some embodiments, certain resource settings of the serverless compute service can be specified. For example, a user can specify the memory size or CPU power that the service can consume. According to some embodiments, users are charged for usage of the serverless compute service based on, for example, the number of times the application code is executed, and how long the application code takes to execute. Depending on the amount of resources needed by the application code and the amount of time required to process the application code, users can identify an optimal combination of resource settings that result in the most efficient usage of the serverless application code. For example, in some scenarios, allocating twice as much memory can cause the application code to execute in half the amount of time, thereby costing the user half as much.

In some embodiments, the different components in the system can be configured to process stories in a wide array of languages and locales. For example, the project management platform can receive stories in Spanish, French, English-UK, English-US, German-Germany, German-Swiss, Simplified Chinese, Traditional Chinese, etc. The speech engine can similarly be configured to process audio and video data in these languages and locales.

In some embodiments, the project management platform can be configured to translate between different languages and provide work estimation on the fly. For example, a historical database of stories can be written in Spanish, while the natural language input and output device and voice processing service can be configured to process audio in English-US. Thus, when a user requests an estimate in English, it can rely on datasets written in a different language. The translation can be performed on the fly through the use of translation APIs such as Google Translate.

In some embodiments, the natural language input and output device and voice processing service can be trained to recognize the voice and mannerisms of a particular user. Thus for example, the natural language input and output device and voice processing service can detect slurs, stutters, and other nuances that are particular to a particular user's speech patterns. In this way, the speech engine can identify wake words, commands, and parameters that may otherwise be distorted or undetectable by a user's slur or stutter. Identifying such nuances of a particular user's speech thus improves the accuracy in identifying wake words, commands, and parameters.

In some embodiments, the systems and methods can use the historical database to determine whether a story appears incomplete or incorrect. For example, a new story for implementing a particular feature may comprise 5 sub-tasks as originally specified by a team. However, after searching through the historical database, the system can be configured to determine that similar features required at least 15 sub-tasks, and that the new story as written is incomplete.

In some embodiments, the systems and methods can track the current progress of a sub-task or story and update estimates based on how much progress has been made. For example, if halfway through a sub-task or story, it is has become apparent that the team is working twice as fast/slow as originally estimated, the story point value can be doubled/halved accordingly.

Similarly, according to some embodiments, a story can be updated to account for unexpected events, such as a developer becoming sick, taking a leave of absence, or otherwise becoming unavailable.

In some embodiments, an update to a sub-task or story can have an impact on their associated epics and other stories falling under the same or similar epic. For example, if a sub-task is updated from 1 story point to 5 story points, the parent story and epic can be increased accordingly.

In some embodiments, a story can be modified or edited in the middle of development. For example, a customer can change or modify the functionalities of a feature after a team has already completed about 50% of the work. A new estimate can be generated that calculates the story point value of the modifications, taking into account the amount of work that has already been completed, and the nature of the work that remains to be completed.

In some embodiments, the natural language input and output device can use a set of configurable rules to control which stop words, punctuation characters, and other linguistic constructs that are not informative or relevant to calculating a story point estimate are to be removed. For example, rules can specify the removal of articles and other commonly used words because such words skew training data. Rules can also perform stemming, where words containing suffixes are truncated to original roots. For example, running can be truncated to run. Rules can also be specified to remove punctuations and other textual information that is irrelevant from a modeling standpoint.

Figure 2:
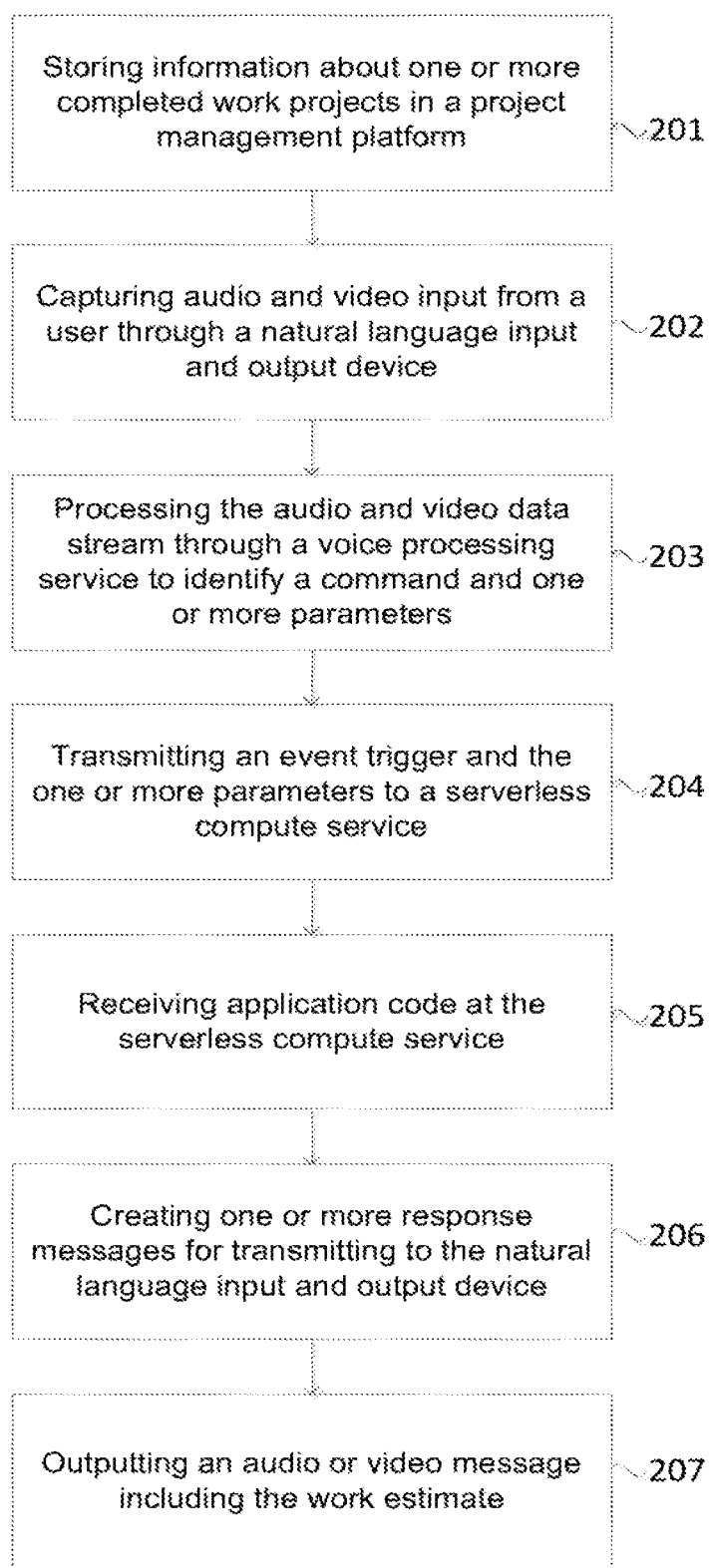
FIG. 2 shows an exemplary method for reducing the latency and improving accuracy of work estimates utilizing natural language processing devices and serverless event-driven parallel data processing architectures according to embodiments of the invention.

FIG. 2 shows examples of methods for reducing the latency and improving accuracy in estimating work utilizing natural language processing devices and serverless event-driven parallel data processing architectures according to certain embodiments of the invention. The methods can include the step of storing information about one or more completed work projects in a project management platform 201. As described above, the project management platform can be configured to store information about one or more completed work projects in the database which can store completed stories and story point values.

The methods can include the step of capturing audio and video input from a user through a natural language input and output device 202. As described above, the natural language input and output device can be configured to capture audio or video input from a user using a speech engine. The speech engine can capture audio and video data streams, which can then be transmitted from the natural language input and output device to the voice processing service over a communication channel established by the communication interface.

The methods can include the step of processing the audio and video data stream through the voice processing service to identify a command and one or more parameters 203. As described above, when the command corresponds to a request for the work estimate, the voice processing service can be configured to transmit an event trigger and the one or more parameters to the serverless compute service 204.

The methods can include the step of receiving application code at the serverless compute service 206. As described above, application code can execute in response to the event trigger and include instructions to determine the work estimate based on the one or more parameters transmitted from the voice processing service. Once the work estimate is determined, the methods can include the step of creating one or more response messages for transmitting to the natural language input and output device 206. As described above, the response message can include a natural language description of the work estimate. The response messages can then be output 207 using the natural language input and output device.

In some embodiments, the words and any other textual information that impacted the story point estimate can be visualized in a visualization module that dynamically displays textual information. The visualization module can dynamically display textual information such as, for example, a word cloud or similar graphic.

The textual information can be based on the deconstructed individual elements of the stories. Thus, the textual information can be the individual elements captured by the natural language input and output devices as described above. The stop words, punctuation characters, and other linguistic constructs that are not informative or relevant to calculating a story point estimate can be removed, leaving the keywords or phrases that were used as the parameters for the classification techniques described above. The visualization module can retrieve the weight derived for each keyword or phrase used in the classification techniques described above. The weights can be normalized by dividing the weight with the maximum weight and then arranged in an array in descending or ascending order according to their normalized weight.

Using the rankings of the keywords or phrases, visual effects can be chosen to convey the importance of the keyword or phrase in the estimation process. For example, a font size, color, font type, or style and effect can be determined based on the relative importance of the keyword or phrase. Thus, the most important keyword or phrase can be shown, for example, in the largest font, in bright red, and with bolding and underlining.

The visualization module can dynamically display textual information by adding, changing, or removing keywords or phrases in real-time. For example, if the set of keywords or phrases is too large to discern any meaningful information, the visualization module can be configured to limit the number of keywords or phrases that appear in the word cloud. The visualization module can further dynamically display textual information by changing or modifying the visual effects of the text. For example, keywords or phrases can change font, size, italics, bolding or underlining in real time. Other visual effects can be used to draw attention to a particular keyword or phrase, such as highlighting, encircling, or blinking a keyword or phrase.

Each keyword or phrase can be represented as a discrete object by the visualization module so that when a visual effect is changed or modified for one particular keyword or phrase, the visualization module can create the visual effect for the particular keyword or phrase, without having to re-render the entire word cloud. In this way, the visualization module can reduce the amount of computer resources and processing used to dynamically display the graphics for each keyword or phrase.

In some embodiments, the word cloud can position the keywords or phrases according to their semantic relationships with each other. For example, keywords and phrases can be grouped according to their task, category, epic, or release, and visually rendered in the word cloud so that they are positioned near each other as clusters. Thus, instead of words sparsely distributed across a word cloud at random, the keywords or phrases that are semantically related to the same group, such as a task or category, will appear clustered next to each other.

The keywords or phrases can be clustered by representing their relevance as a distance in a matrix in n-dimensional space. For example, the relevance of each keyword or phrase to the group it belongs to can be quantified numerically, and then used as the distance in the n-dimensional matrix. Multidimensional scaling can then be used to obtain two-dimensional positions for the keywords or phrases so that physical distances between each keyword or phrase are created according to their semantic closeness.

In some embodiments, the layout is sparse and can be compacted via a force-directed algorithm. A triangular mesh process, such as Delaunay triangulation, can be computed from the initial keyword or phrase positions to create a planar mesh. As a result, the keywords and phrases that are semantically related will appear visually adjacent to each other in the word cloud. In this way, the word cloud provides context to each keyword or phrase.

The layout and visual effects of the dynamic visualization module can also be used to show why a particular keyword or phrase was given more weight than another. In some embodiments, the semantic relatedness of the keywords or phrases can also be shown using color, font types, and other similar visual renderings.

In some embodiments, an interactive audio-enabled touch screen can be used to display the word cloud and provide more context through the use of audio and visual cues. For example, the audio-enabled touch screen can be an Alexa Show device, and can be configured to provide audio that narrates which terms were weighted most and why. The screen can be configured to provide effects, such as for example, highlighting, encircling, or enlarging terms in the cloud, in sync with the audio. In this way, as a term is being described by the audio narrative, the display will show a visual effect for that term.

The visual effects can be achieved by including event listeners that are configured to execute upon the detection of a keyword or phrase. For example, if the audio narrative recites a particular keyword or phrase (e.g., "filter" or "tickets"), it can execute code that will highlight or encircle that keyword or phrase in the word cloud. Similarly, if a user taps or selects a keyword or phrase in the word cloud, the event listener can be configured to display additional information about the keyword or phrase to provide more context. For example, tapping or selecting the "filter" or "tickets" keyword can cause the dynamic visualization module to display a pop-up that shows that keyword's weight and the category it is related to (if any).

In some embodiments, the interactive audio-enabled touch screen can be configured to respond to user interactions to control how the word cloud is displayed. For example, the audio-enabled touch screen can rotate, pan, or zoom into various sections of the word cloud to provide a closer analysis of certain keywords or phrases. Such controls can be particularly useful where, for example, a word cloud is crowded and smaller keywords or phrases are difficult to see. In some embodiments, the interactive audio-enabled touch screen can include a search field that allows a user to enter a search for a particular keyword or phrase. The dynamic visualization module can then highlight or encircle the matching keyword or phrase.

Visual renderings such as word clouds can be saved and stored for future reference. For example, a word cloud can be stored in a database such as a NOSQL database. The word cloud can be stored by saving the words and other information, such as their respective weights or semantic relatedness, to the NOSQL database. Once stored, they can be retrieved for displaying again. They can be displayed again as a word cloud, or in some other type of visual rendering.

The database of stored word clouds can be indexed and made searchable so that users can search for and find previously created word clouds. In some embodiments, the database can perform indexing of the word clouds off-line, so that searches are optimized. In some embodiments, the database can perform searches and retrieve information across all saved word clouds. For example, the database can be searched to determine what are the most common keywords or phrases that are used globally across all word clouds.

The embodiments described in this disclosure can be combined in various ways. Any aspect or feature that is described for one embodiment can be incorporated into any other embodiment mentioned in this disclosure. Moreover, any of the embodiments described herein may be hardware-based, software-based and/or comprise a mixture of both hardware and software elements. Accordingly, while various novel features of the inventive principles have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps of any described methods may be carried out in different orders in many cases where such may be appropriate. Those skilled in the art will recognize, based on the above disclosure and an understanding therefrom of the teachings of the inventive principles, that the particular hardware and devices that are part of the system described herein, and the general functionality provided by and incorporated therein, may vary in different embodiments of the inventive principles. Accordingly, the particular system components are for illustrative purposes to facilitate a full and complete understanding and appreciation of the various aspects and functionality of particular embodiments of the present principles as realized in system and method embodiments thereof. Those skilled in the art will appreciate that the inventive principles can be practiced in other than the described embodiments, which are presented for purposes of illustration and not limitation.

The invention claimed is:

1. A system for reducing latency and improving accuracy in estimating work utilizing natural language processing devices and serverless event-driven parallel data processing architectures, the system comprising:
   a project management platform configured to store information about one or more completed work projects in a database of completed stories and story point values, wherein the completed stories comprise keywords or phrases;
   a natural language input and output device configured to capture audio and video input from a user and output an audio or video message including a work estimate, wherein the natural language input and output device comprises a speech engine that controls capture of an audio and video data stream upon detection of a wake word, and a communication interface configured to establish a communication channel between the natural language input and output device and a voice processing service, wherein the natural language input and output device transmits the audio and video data stream to the voice processing service over the communication channel, and wherein the voice processing service is configured to process the audio and video data stream to identify a command and one or more parameters, and create one or more response messages for transmitting to the natural language input and output device, and when the command corresponds to a request for the work estimate the voice processing service transmits an event trigger and the one or more parameters; and
   a serverless compute service configured to receive application code, and the one or more parameters transmitted from the voice processing service, wherein the application code executes in response to the event trigger, the application code comprising instructions to determine the work estimate based on the one or more parameters,
   wherein:
   the one or more parameters define a scope of the work estimate;
   the work estimate is determined by applying a Bayesian classifier to the one or more parameters and the information about one or more completed work projects stored in the project management platform;
   the work estimate is further determined by calculating a prior probability for each of the keywords or phrases occurring in the completed stories;
   the prior probabilities for the keywords or phrases are stored in a historical database;
   applying the Bayesian classifier to the one or more parameters comprises classifying the one or more parameters based on the prior probabilities for the keywords or phrases;
   the keywords or phrases occurring in the completed stories are dynamically displayed in a visualization module as a word cloud;
   the word cloud displays positions of the keywords or phrases based on a clustering the keywords or phrases by relevance distances representing semantic closeness; and
   the relevance distances are generated based on multidimensional scaling of a matrix in an n-dimensional space that represents distances between the keywords or phrases.

2. The system of claim 1, wherein the work estimate is determined based on historical story point data having similar descriptions, attributes, or sub-tasks.

3. The system of claim 1, wherein Laplace estimation or Lagrange correction is applied to probability estimates used by the Bayesian classifier.

4. The system of claim 1, wherein the relevance distances are represented as 2 dimensional positions for the keywords or phrases after the multidimensional scaling of the matrix in the n-dimensional space.

5. The system of claim 1, wherein the instructions to determine the work estimate include instructions to train a data set based on the completed stories and the story point values, and to generate conditional probabilities for each keyword or phrase of a story using Naïve Bayes Linear SVM classification.

6. The system of claim 1, wherein Term Frequency, Inverse Document Frequency ("TF-IDF") is used to convert each keyword or phrase of a story into vectors.

7. The system of claim 1, wherein the voice processing service processes the audio and video data stream to identify each keyword or phrase of a story.

8. The system of claim 5, wherein the serverless compute service is configured to receive application code that performs Bayesian classification on trained data sets.

9. The system of claim 1, wherein the voice processing service is configured to generate a response message that comprises a natural language description of the work estimate, transmit the response message to the natural language input and output device, and wherein the natural language input and output device is configured to play the response message.

10. The system of claim 1, wherein the project management platform translates between different languages to provide the work estimate.

11. The system of claim 1, wherein the natural language input and output device and voice processing service detects a slur or stutter.

12. The system of claim 1, wherein the database of the completed stories and the story point values is used to determine whether a story is incomplete or incorrect.

13. A method for reducing latency and improving accuracy in estimating work utilizing natural language processing devices and serverless event-driven parallel data processing architectures, the method comprising:
   storing information about one or more completed work projects in a project management platform using a database of completed stories and story point values, wherein the completed stories comprise keywords or phrases;
   capturing audio and video input from a user through a natural language input and output device, wherein the natural language input and output device comprises a speech engine that controls capture of an audio and video data stream upon detection of a wake word, and a communication interface configured to establish a communication channel between the natural language input and output device and a voice processing service, wherein the natural language input and output device transmits the audio and video data stream to the voice processing service over the communication channel;

processing the audio and video data stream through the voice processing service to identify a command and one or more parameters;

creating one or more response messages for transmitting to the natural language input and output device;

transmitting an event trigger and the one or more parameters to a serverless compute service when the command corresponds to a request for a work estimate;

receiving application code at the serverless compute service, receiving the one or more parameters at the serverless compute service, wherein the application code executes in response to the event trigger, the application code comprising instructions to determine the work estimate based on the one or more parameters; and outputting an audio or video message including the work estimate, wherein:
the one or more parameters define a scope of the work estimate;

the work estimate is determined by applying a Bayesian classifier to the one or more parameters and the information about one or more completed work projects stored in the project management platform;

the work estimate is further determined by calculating a prior probability for each of the keywords or phrases occurring in the completed stories;

the prior probabilities for the keywords or phrases are stored in a historical database;

applying the Bayesian classifier to the one or more parameters comprises classifying the one or more parameters based on the prior probabilities for the keywords or phrases;

the keywords or phrases occurring in the completed stories are dynamically displayed in a visualization module as a word cloud;

the word cloud displays positions of the keywords or phrases based on a clustering the keywords or phrases by relevance distances representing semantic closeness; and the relevance distances are generated based on multi-dimensional scaling of a matrix in an n-dimensional space that represents distances between the keywords or phrases.

14. The method of claim 13, further comprising applying Laplace estimation or Lagrange correction to probability estimates used by the Bayesian classifier.

15. The method of claim 13, further comprising training a data set based on the completed stories and the story point values, and generating conditional probabilities for each keyword or phrase of a story using Naïve Bayes Linear SVM classification.

16. The method of claim 15, wherein the serverless compute service receives application code that performs Bayesian classification on trained data sets.

17. The method of claim 13, wherein the step of creating one or more response messages comprises a natural language description of the work estimate using the voice processing service as the one or more response messages, and where the step of outputting the audio or video message comprises playing the response message using the natural language input and output device.

18. The method of claim 13, further comprising translating between different languages to provide the work estimate.

19. The method of claim 13, further comprising using the natural language input and output device and voice processing service to detect a slur or stutter.

20. The method of claim 13, further comprising determining whether a story is incomplete or incorrect based on the database of the completed stories and the story point values.

* * * * *